United States Patent
Singer

(10) Patent No.: US 9,897,697 B2
(45) Date of Patent: Feb. 20, 2018

(54) DISTANCE MEASURING METHOD USING DYNAMIC PULSE WIDTH ADAPTATION

(71) Applicant: HEXAGON TECHNOLOGY CENTER GMBH, Heerbrugg (CH)

(72) Inventor: Julien Singer, Berneck (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 582 days.

(21) Appl. No.: 14/406,469

(22) PCT Filed: Jun. 13, 2013

(86) PCT No.: PCT/EP2013/062291
§ 371 (c)(1),
(2) Date: Dec. 8, 2014

(87) PCT Pub. No.: WO2013/189837
PCT Pub. Date: Dec. 27, 2013

(65) Prior Publication Data
US 2015/0138529 A1 May 21, 2015

(30) Foreign Application Priority Data

Jun. 18, 2012 (EP) ................................ 12172442

(51) Int. Cl.
*G01C 3/08* (2006.01)
*G01S 17/08* (2006.01)
(Continued)

(52) U.S. Cl.
CPC ............. *G01S 17/08* (2013.01); *G01C 15/002* (2013.01); *G01S 7/483* (2013.01); *G01S 7/497* (2013.01)

(58) Field of Classification Search
CPC .......... G01S 17/08; G01S 7/483; G01S 7/497; G01C 15/002
See application file for complete search history.

(56) References Cited

U.S. PATENT DOCUMENTS

| 5,949,530 A | 9/1999 | Wetteborn |
| 7,508,496 B2 | 3/2009 | Mettenleiter et al. |

(Continued)

FOREIGN PATENT DOCUMENTS

| CN | 1384371 A | 12/2002 |
| DE | 197 07 936 A1 | 9/1998 |

(Continued)

OTHER PUBLICATIONS

European Search Report dated Nov. 23, 2012 as received in Application No. EP 12 17 2442.

*Primary Examiner* — Samantha K Abraham
(74) *Attorney, Agent, or Firm* — Maschoff Brennan

(57) ABSTRACT

A method for measuring a distance to an object with emitting pulsed laser light with defined measurement pulse width is disclosed. In some embodiments, the pulse width of the laser light is dynamically adjustable. The method may include receiving at least a part of the pulsed laser light with defined measurement pulse width reflected from the object, and precisely determining the distance to the object by means of the received laser light. Some embodiments may include pre-adjusting an actual pulse width of the emitted laser light in an automated and continuous manner for providing the defined measurement pulse width by performing a test measurement by emitting an amount of adjusting laser light with the actual pulse width. Some embodiment may include receiving at least a part of the adjusting laser light reflected from the object and determining a test distance to the object using the received adjusting laser light.

19 Claims, 5 Drawing Sheets

(51) Int. Cl.
  *G01C 15/00* (2006.01)
  *G01S 7/497* (2006.01)
  *G01S 7/483* (2006.01)

(56) References Cited

U.S. PATENT DOCUMENTS

2005/0205755 A1   9/2005   Walsh et al.
2009/0273770 A1   11/2009  Bauhahn et al.

FOREIGN PATENT DOCUMENTS

| DE | 10 2005 027208 A1 | 6/2006 |
| DE | 10 2010 015 941 A1 | 9/2011 |
| WO | 00/06970 A1 | 2/2000 |

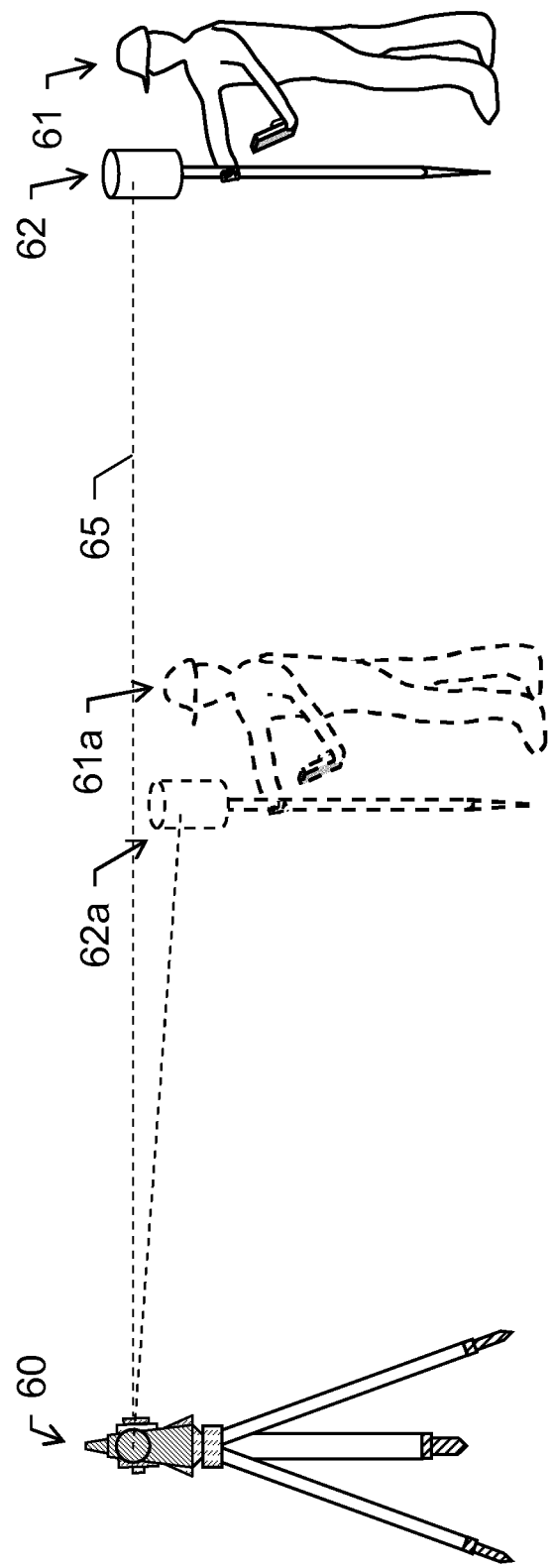

DISTANCE MEASURING METHOD USING DYNAMIC PULSE WIDTH ADAPTATION

FIELD OF THE INVENTION

The present invention generally pertains to a method for measuring a distance to an object, and to an electronic distance meter for measurement of the distance to the object.

BACKGROUND

The acquisition of data and subsequent generation of computer models for real-world objects is of interest in many industries and for many applications including architecture, physical plant design, surveying, manufacturing quality control, medical imaging and construction, as well as cartography and geography applications. In order to obtain accurate coordinates or 3D models of an object, as well as the area in which that object exists in the real world, it is necessary to take accurate measurements, or samplings of surfaces that make up the object, and elements of the surrounding area. Historically, this sampling was carried out using techniques that provided samples at the rate of tens or hundreds per hour at most.

Recent advances in scanning technology, such as technologies utilizing LIDAR scanning, have resulted in the ability to collect billions of point samples on physical surfaces, over large areas, in a matter of hours, minutes or even seconds. In a scanning process, the scanning device scans a laser beam across a scene that encompasses the structure of interest and the beam reflected from the scene is captured by the scanning device. The scanning device thus measures a large number of points that lie on surfaces visible in the scene. Each scan point has a measured location in 3D space, within some measurement error, that typically is recorded relative to a point (x,y,z) in the local coordinate system of the scanner. The resulting collection of points is typically referred to as one or more point clouds, where each point cloud can include points that lie on many different surfaces in the scanned view.

Conventional scanning systems do not natively create points but instead create sets of ranges with associated mirror angles which are converted to x, y and z coordinates. The function which maps these native measurements into x, y and z coordinates depends on how the scanner was assembled and, for high accuracy systems, is different for each scanner and is a function of temperature and other environmental conditions. The differences between scanner systems are typically represented by a collection of numbers called calibration parameters.

For acquisition of a precise position of targets, in particular in field of surveying, total stations are mainly used today. Such targets could be typified by non-reflective or reflective objects like prisms. A total station is a manually operated optical instrument used in surveying. A total stations is a combination of an electronic theodolite (transit), an electronic distance meter (EDM) and software running on a computer e.g. a remote computer known as data collector. With a total station one may determine angles and distances from the instrument to points to be surveyed. With the aid of trigonometry and triangulation, the angles and distances may be used to calculate the coordinates of actual positions (x, y, and z or northing, easting and height) of surveyed points, or the position of the instrument from known points, in absolute terms. Modern total station instruments measure angles by means of electro-optical scanning of extremely precise digital bar-codes e.g. etched on rotating glass cylinders or discs within the instrument.

As the aforementioned systems work with laser light and enable measuring of object within relative great distances the hazardousness of human and animal tissue, in particular concerning eyes of human beings, to be damaged is quite high when entering an area where such a measurement is performed.

With view to laser safety, DE 10 2005 027 208 describes a method for controlling a laser scanner in a way that laser power is reduced or the laser is switched off depending on a distance to an object. Furthermore, it is proposed to define a fixed laser power during a scan. The scan is started with maximum laser output power. If the minimum distance measured is smaller than the processed safe distance the scan is stopped, the laser output power is scaled down and the scan is started again. This process is recursive. If the measured distance is smaller than the minimum safe distance at a defined minimum laser output and being the lowest laser output power step, the scan is canceled.

Additionally, US 2005/0205755 proposes a method for adaptive controlling laser parameters in dependency on environmental influences. In that context, in near field the laser output power is reduced to accommodate the laser safety limits. According to an embodiment, for maintaining safety regulations two distance ranges are used—one with limited laser output power and another with full laser power. The laser power amplitude is controllable by an optical attenuator, e.g. filter wheel, from 20 up to 200 amplitude steps. The attenuator is set depending on range or receiving signal strength.

According to the technical solution of DE 10 2005 027 208 the laser power is fixed while the scan is running and, thus, a disadvantageousness of varying measurement performance over the scanned area caused by different distances to be measured remains.

According to the technical solution of US 2005/0205755 the laser power, in particular the amplitude, is adjustable for meeting laser safety as well, but still the problem of varying measurement performance within one scanning period remains. In particular a signal-to-noise ratio of the systems is not considered for scanning, wherein this ratio influences the quality of measurement and is depending on the distance to an object and, therefore, changes with distance.

SUMMARY

Some embodiments of the present invention provide an improved method for controlling laser output properties in light of laser safety requirements and measurement performance for distance measurement and a corresponding measurement device.

Some embodiments of the present invention provide an improved laser scanner or a total station, respectively, comprising functionality for guaranteeing laser safety for human beings at scanning or position determination of a target.

Some embodiments of the invention provide a method for controlling a measurement device in order to continuously providing systems settings for high quality measurement performance while scanning and/or while position determination of a target.

The invention relates to a method for measuring a distance to an object comprising emitting pulsed laser light with defined measurement pulse width, wherein the pulse width of the laser light is adjustable. In addition receiving at least a part of the pulsed laser light with defined measurement pulse width reflected from the object and precisely determining the distance to the object by means of the received laser light are performed.

According to the invention the defined measurement pulse width of the emitted laser light is provided by pre-adjusting an actual pulse width of the emitted laser light in an automated and continuous manner. This adjusting is realised by performing a test measurement by emitting an amount of adjusting laser light with the actual pulse width, receiving at least a part of the adjusting laser light reflected from the object and determining a test distance to the object by means of the received adjusting laser light. Furthermore, in context of the pre-adjusting a measurement pulse width region on basis of a defined distance criterion is defined, wherein the distance criterion provides at least a maximum laser emission level in dependency of the test distance, and the actual laser pulse width is pre-adjusted so that the pre-adjusted pulse width lies within limits of the measurement pulse width region and provides the measurement pulse width.

Such limitation by defining a measurement pulse width region is performed in order to meet particular laser safety regulations by limiting the emitted laser power per time period to a defined maximum level.

Concerning an fine-adjusting of the pulse width according to the invention, the pre-adjusted pulse width could be automatically and continuously fine-adjusted within the measurement pulse width region in dependency of a determined measurement performance parameter so that the fine-adjusted pulse width provides the measurement pulse width.

Such fine-adjusting may be performed in a simultaneous manner with the pre-adjusting, i.e. the test distance and the measurement performance parameter are considered both within one adaptation step and the pulse width is adjusted on that basis. Alternatively or additively, the fine-adjusting may be performed after a first pre-adjusting of the laser pulse width so that the pulse width lies within the measurement pulse width region.

These two adjusting steps are performed in a continuous manner, i.e. the adjustment is performed at particular rates, e.g. once a second or once a microsecond, wherein the rates could be defined so that the adjustment is performed in real-time while measuring.

Particularly, according to the invention, the measurement performance parameter may represent an overall signal-to-noise ratio. The overall signal-to-noise ratio is defined by a photon noise generated by the stochastic distribution of emitted photons within one single laser pulse, in particular by the stochastic distribution of photon energy. Alternatively or additionally, the overall signal-to-noise ratio is defined by receiver noise (signal noise) generated by receiver electronics and/or signal processing on side of a detector receiving the laser light reflected from the object, in particular wherein the detector is built as photosensitive detector.

Range noise (or as equivalently used within the present application "overall signal-to-noise ratio") in sense of the present invention is to be understood as a distance uncertainty due to an emitted (e.g. laser light) and/or received and/or detected and/or processed signal. Such uncertainty typically may be caused by appearance and/or detection of different signal levels around a signal which theoretically is supposed. Additionally, the range noise is to be understood as noise occurring with electronics e.g. with detectors or processing units for signal processing. In this context, range noise is influenced at least by electronics of a detector and/or by stochastic distribution of emitted photons of a laser source. Range noise of such system is directly related to at least the laser pulse width. Indeed, the smaller the pulse width the more timely "grouped" the photons are emitted. The time jitter between the photons of a given pulse is reduced. This leads to a reduced emitter photon noise and lower range noise. The dependency between the width of the optical pulse and the corresponding range noise at constant pulse energy and within the bandwidth of the receiver is linear. Short pulses help minimization of speckles effects which are an additional source of range noise. The aim of the feature is to control the pulse width using both distance information and signal-to-noise information in order to reduce the range noise of a scanning system, e.g. a LIDAR system.

Concerning the influences on the overall range noise, the latter can be lowered by reducing the pulse width in case of the photon noise being the dominant source of range noise or by increasing the pulse width in case of the receiver noise being the dominant source of range noise, wherein the pulse width being reduced or increased within the measurement pulse width region.

With other words, according to a specific embodiment of the invention, the range noise or overall signal-to-noise ratio is adapted by reducing the pulse width in case of the photon noise being dominant compared to the receiver noise with view to the overall signal-to-noise ratio or by increasing the pulse width in case of the receiver noise being dominant compared to the photon noise with view to the overall signal-to-noise ratio. Thus, the pulse width is reduced or increased within the measurement pulse width region, in particular wherein the overall signal-to-noise ratio is reduced.

Relating to a specific embodiment of the invention the measurement performance parameter represents a signal level range for the detector and the pre-adjusted pulse width is fine-adjusted so that the received laser light matches the signal level range.

Therewith, the pulse energy can be set to match a particular and favorable signal level range at the receiver side of a laser distance measurement instrument by means of varying the pulse width (relating to FWHM=Full Width at Half Maximum). This method of varying the laser pulse width extends the received signal dynamic range of the device and guarantees a smaller overall amplitude non-linearity error.

Now referring to the aspect of the specified distance criterion according to the invention, in context with a particular embodiment of the invention the distance criterion is given by an algorithm for defining the measurement pulse width region by calculating the maximum laser emission level in dependency on the measured test distance, wherein the calculation may be performed in real-time manner.

With a further embodiment—according to the invention—the distance criterion is given by a look-up table for defining the measurement pulse width region by comparing the measured test distance with distances which are allocated to particular pulse width regions by the look-up table.

According to the invention, the pulse width is determined using information of one or several preceding (distance) measurements.

According to the invention, the pulse width may be adjusted dynamically, i.e. with a predefined actualisation rate (e.g. in real-time), and/or autonomously during the execution of a measurement procedure.

Furthermore, in light of determination of a position of the object, according to the invention determining a direction of emission of the pulsed laser light and deriving a position of the object from the determined direction of the laser light and the precisely measured distance may be performed.

Moreover, according to the invention the maximum laser emission level may be defined for each distance by a laser safety regulation, i.e. if laser class 1 is define for a system the maximum laser emission level correspondingly is defined.

Particularly, the emission level may be defined by the distance to be measured and a corresponding measurement mode.

The invention also relates to an electronic distance meter for measurement of a distance to an object comprising a beam source for emission of pulsed laser light with defined measurement pulse width, wherein the beam source is designed such that the laser pulse width is adjustable, receiving means for receiving at least a part of the pulsed laser light reflected from the object, distance measurement means for precise measurement of the distance to the object by means of the pulsed laser light received by the receiving means and a controlling and processing unit.

According to the invention the electronic distance meter comprises a pre-adjusting functionality, wherein on execution of the pre-adjusting functionality an actual laser pulse width is pre-adjusted in an automated and continuous manner controlled by the controlling and processing unit; with other words: the defined measurement pulse width of the emitted laser light is provided by pre-adjusting the actual laser pulse in an automated and continuous manner controlled by the controlling and processing unit. In context of the pre-adjusting a test measurement is performed by emitting an amount of adjusting laser light with the actual pulse width, receiving at least a part of the adjusting laser light reflected from the object and determining a test distance to the object by means of the received adjusting laser light. In addition, defining a measurement pulse width region on basis of a defined distance criterion, wherein the distance criterion provides at least a maximum laser emission level on dependency of the test distance, and pre-adjusting the actual laser pulse width so that the pre-adjusted pulse width lies within limits of the measurement pulse width region and provides the measurement pulse width is done.

Referring to specific embodiments of the invention, the controlling and processing unit is configured so that a method according to the invention for measuring a distance to an object is executable.

Concerning measurement devices using an electronic distance meter according to the invention, a laser scanner with the electronic distance meter may further comprise a base defining a vertical axis, a support member rotateable around the vertical axis relative to the base and defining a horizontal axis, a beam guiding unit, in particular mirror, rotatable around the vertical and the horizontal axis relative to the base and first angle measurement means for determination of a direction of a beam of pulsed laser light emitted from the beam source and guided with the guiding unit.

Another aspect of the invention relates to a geodetic measurement device, in particular total station, for determination of a position of an object comprising the electronic distance meter. The geodetic measurement device can further comprise a base defining a vertical axis, a support member rotateable around the vertical axis relative to the base and defining a horizontal axis, an aiming unit rotatable around the vertical and the horizontal axis relative to the base for directing the pulsed laser light towards the object (with the beam source and a telescope) and second angle measurement means for determination of an orientation of the aiming unit relative to the base and the support member.

In addition to the adaptive control of laser pulse width as described above, the bandwidth of the receiver (detector) can dynamically be adapted within one pulse period to ensure the best matching of pulse width and bandwidth and maximize sensitivity and precision of measurement.

Furthermore, the invention relates to a computer program product with program code being stored on a machine readable medium, the program code being configured to automatically execute and operate the method for measuring a distance to an object according to the invention, particularly if the program is carried out on a control unit of the surveying instrument according to the invention.

BRIEF DESCRIPTION OF THE DRAWINGS

The invention in the following will be described in detail by referring to exemplary embodiments that are accompanied by figures, in which:

FIG. 7 shows a first embodiment of a total station comprising the adaptation functionality according to the invention.

DETAILED DESCRIPTION

Figure 1:
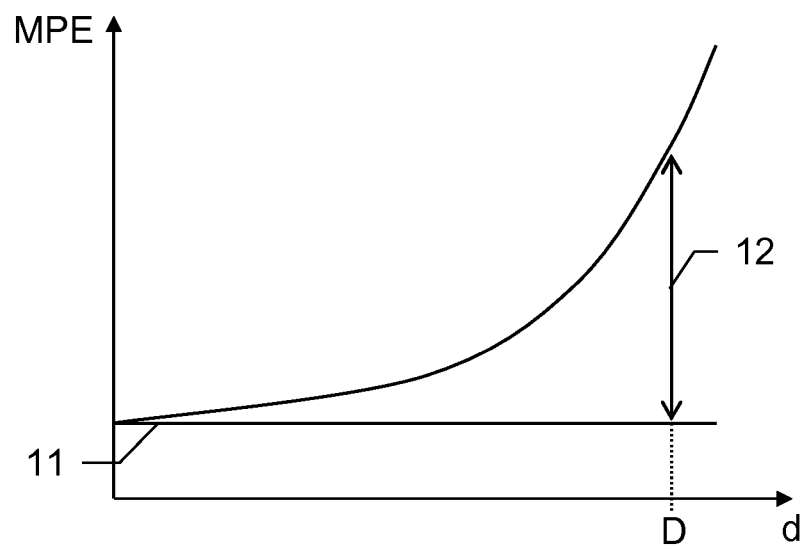
FIG. 1 shows a chart defining a maximum permissible emitting laser power concerning eye-safe laser emission in dependency on a distance to an object.

FIG. 1 shows a chart defining the maximum permissible exposure MPE to laser light in dependency on a distance d to an object or to a target. The maximum permissible exposure MPE defines an amount of laser light (e.g. with defined wavelength and energy) being tolerable for impinging on a human eye within a defined time period, wherein the laser output power is generally limited by a maximum safe emission in near field 11.

To guarantee that a measurement device according to the invention emits within a certain laser class, in particular laser class 1, on the whole measurement range, the laser output power or laser pulse energy is generally limited by the maximum safe emission in near field 11. The distance at which the laser power is equal to the maximum allowable laser energy is called NOHD (nominal ocular hazard distance), i.e. with smaller distance to the object eye damage could be caused by laser irradiation.

The adaptive pulse width control feature proposed with the present invention is a technique using a variable laser pulse width in order to guarantee that the laser emission is below the tolerated emission limit given by a particular laser class at any distance.

A difference 12 between laser emission limited by near field 11 and eye-safe power limit at distance D defines an allowed region for adapting the laser exposure e.g. by inventive pulse width adaptation.

Figure 2:
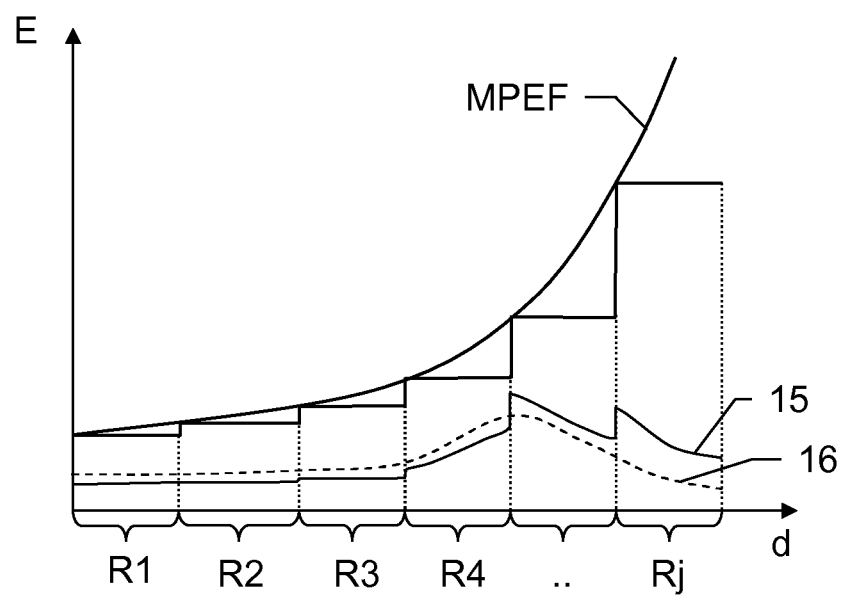
FIG. 2 shows a first embodiment for definition of permitted pulse width regions depending on the distance to the object according to the invention.

FIG. 2 shows a definition of pulse width regions R1-Rj (j integer) depending on the distance d to the object according to the invention. Of course the invention is not limited to the definition of the shown number of regions R1-Rj, but may be based on a different number of defined regions. An inventive measurement device comprises an adaptation functionality using such a division into particular distance R1-Rj in order to meet laser safety regulations by limiting laser output power to maximum eye-safe emission given by the MPE function MPEF.

The MPEF (distance criterion) defines a maximum laser emission level (within a defined time interval) for each distance between the object and the light source, wherein this maximum laser emission level must not be exceeded in order to maintain a specific laser class defined by the laser safety regulation (defined by specific MPE function).

The amount of laser light impinging on the object and not going beyond the distance criterion, wherein the distance criterion provides at least the maximum laser emission level on dependency of a previously measured test distance, depends on the distance between the laser source and the object. As the laser pulses—according to the invention—are emitted at a defined frequency from the laser light source the amount of laser light impinging on the aimed object within a defined time interval is dependent on this pulse-to-pulse frequency, as well.

Furthermore, the amount of laser light impinging on the object is dependent on the pulse width of the single pulses, wherein in particular the pulses are emitted with a given frequency. According to the invention, the pulse width of each pulse is continuously adapted so that a given exposure limit, e.g. MPEF or distance criterion, is not exceeded.

For this purpose a device measurement range d is divided into the several distance ranges R1-Rj. Each range is associated with a maximum allowable emission strength (maximum laser emission level) in particular defined by the laser safety regulations.

On basis of a measurement of a test distance to the object one of the ranges R1-Rj could be identified for defining a pulse width region with a maximum and a minimum pulse width value. Thus, there is a region given or defined within which the width of the emitted laser pulses is being adjustable for a precise distance measurement to the object. According to predefined criteria the limits of the region are set so that with each pulse width within that limits (at given pulse-to-pulse frequency and laser power or amplitude respectively) the predefined criteria are fulfilled.

Furthermore, FIG. 2 shows a curve 16 which corresponds to a received energy when using constant pulse width. A further curve 15 illustrates received energy when using pulse with adaptation according to the invention. On the one hand, concerning near field measurements, the received energy is reduced by pulse adaptation. On the other hand, for long range measurements energy gain is received (compared to constant pulse width).

Figure 3:
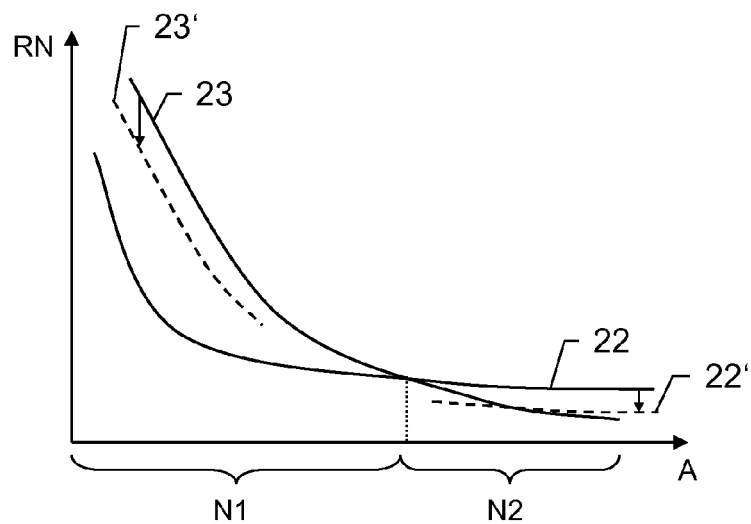
FIG. 3 exemplarily illustrates—according to the invention—sources of range noise due to photon noise and receiver noise in dependency of the received signal amplitude A.

According to a specific embodiment, FIG. 3 illustrates individual sources of range noise due to the photon noise 22 and receiver noise 23 (signal noise) in dependency of the received signal amplitude A, wherein the overall range noise performance is determined by the combination of individual source of range noise.

According to the present embodiment, the overall SNR information is used additionally to adapt the pulse width within a pre-defined distance range (according to the procedure described with FIG. 2). Therefore, the maximum (and minimum) pulse width is limited by the limits associated with the chosen distance range. The aim of such adaptation is a reduction of the range noise RN within a given distance range.

Range noise RN due to receiver noise 23 is dominant within the amplitude range N1 and range noise due to photon noise 22 is dominant in amplitude range N2.

If the photons noise 22, which is produced by the laser emitter, is the dominant source of overall range noise RN, the pulse width is reduced in order to reduce the total range noise RN. If the receiver noise 23 is the dominant source of range noise RN, the pulse width could be increased in order to reduce the range noise RN.

As can be seen from FIG. 3, an improved receiver noise curve 23' represents improved total range noise RN with increased pulse width (compared to the pulse width due to receiver noise 23) for receiver noise being dominant and an improved photon noise curve 22' represents total range noise improvement with by reduction of pulse width if photon noise is dominant.

In context of changing the pulse width the allowed changing is limited by the maximum (permitted) pulse width given by the power limit of a predefined criterion e.g. the laser safety regulation.

Receiver noise 23 typically is the dominant source of range noise for long range measurements. For such long distances, wide laser pulses are used. The higher pulse energy, which is generated by wider pulses, leads to a lower overall range noise RN.

For short ranges, the laser pulse width is to be reduced to guarantee an eye-safe emission at the given range. Moreover, the shorter laser pulses help limiting the dynamics of the received signal and reduce the emitter photon noise 22 which is the limiting parameter for range noise RN in near field (up to "Scheinwerfergrenzdistanz").

The distance and signal-to-noise ratio information, which enable to select a proper pulse width, are based on a preceding test measurement of a distance to the currently aimed object.

As mentioned above, receiver noise 23 typically is the dominant source of range noise for long range measurements. Long range measurements allow a comparable high MPE (see FIG. 1) which consequently allows high pulse energy and, thus, wide pulses. Therefore, lower noise at longer ranges is achievable.

For short ranges laser photon noise 22 is typically the dominant source of range noise. Short range measurements demand relatively low MPE and, thus, low pulse energy and short pulses. With a further reduction of pulse width photon noise 22 is reduced which leads to lower overall noise.

In particular, the adaptation of pulse width may be performed depending on receiver bandwidth. Considering a given receiver bandwidth, the longer the pulse width, the more energy is within the receiver bandwidth.

Figure 4:
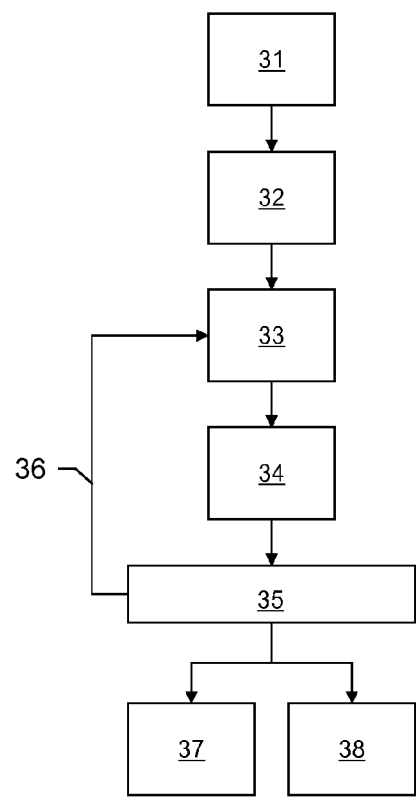
FIG. 4 is a schematic block diagram illustrating a first embodiment for adaptation of the laser pulse width according to the invention.

FIG. 4 shows a schematic block diagram illustrating a first embodiment for adaptation of the laser pulse width according to the invention.

In a first step, a scan with an electronic distance meter, in particular with a laser scanner, is launched 31. For that reason, a particular scan filed and a point-to-point resolution of the measuring point are defined. At the beginning of the scan a default laser pulse width and power is set 32. With those settings a test distance to at least one measuring point and the signal-to-noise ratio of that recorded measuring point (pixel) are determined 33.

Afterwards, the laser pulse width is set 34 using the determined distance and signal-to-noise ratio information following a defined look-up table or following a defined algorithm for calculating a suitable pulse width. After setting the suitable pulse width the scan is continued with the defined laser parameters and the distance and signal-to-noise determination according to 33 is continuously performed 36, on basis of which an automated and continuous resetting of the laser pulse width 34 is done during scanning. A continuous setting or adjusting of the laser pulse width could be performed with defined rates, i.e. a resetting of the pulse width could be done once a second or with a frequency of 1 kHz or with higher actualisation rates from pulse to pulse. Such automatic control (feedback control) is performed until the whole scan field is scanned and the scan is finished 37 or until a scan error occurs and/or the scan is cancelled 38.

The advantage of this controlling is providing measurement equipment like a laser scanner or a total station which fulfils given laser safety regulations and, therefore, could be classified with a particular laser class. Moreover, by continuously controlling and setting the pulse width, in particular by fine-adjusting, and with that controlling the emitted laser power measuring or scanning performance could be significantly increased. E.g. the laser power could be adapted so that a predefined sensitivity range of a photo-sensor in the measurement system could be matched continuously.

Figure 5A:
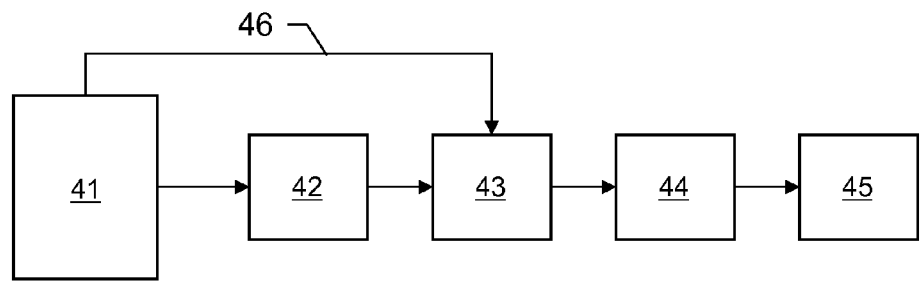
FIGS. 5a and 5b are schematic block diagrams showing a controlling of a laser source according to the invention in order to generate laser light with defined pulse width.
Figure 5B:
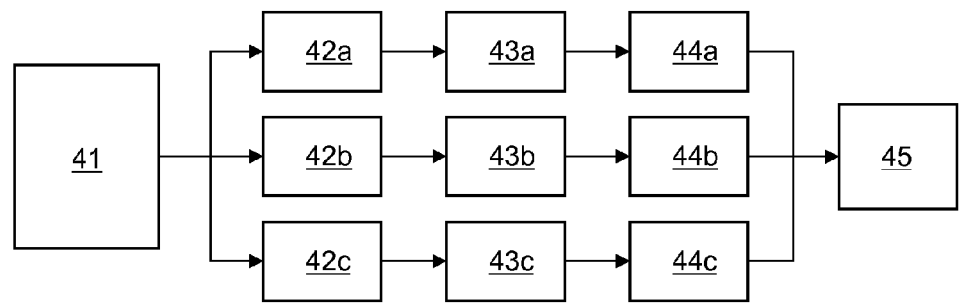

FIGS. 5a and 5b show block diagrams illustrating the controlling of a laser source according to the invention, in particular of a laser diode or laser diode seeded fiber-amplifier, in order to generate laser light with defined pulse widths. Two different topologies are proposed for the control of the pulse width of the laser. The pulse width mainly depends on the discharge capacitor value.

According to a first method of FIG. 5a a configurable capacitor network 43 is used for the control of the pulse width. A controller 41 controls the charging of a capacitor charging circuit 42 which provides the charging of the network of capacitors 43 (a plurality of capacitors). A digital laser pulse width selection 46 for defining particular pulse widths is controlled by the controller 41 as well. A capacitor discharge circuit 44 is provided in the system for performing the discharging of each of the capacitors 43 in order to control the laser diode 45 so that laser light with defined pulse width is emitted.

According to FIG. 5b a second method is dealing with several parallel charge 42a-c and discharge 44a-c circuits, wherein the controller 41 controls several channels 42a,43a, 44a to 42c,43c,44c for defining a pulse width of laser light emitted by the diode 45.

Both topologies enable controlling the pulse width discretely. In this context, in particular, 64 pulse width steps can be realised. The pulse width can be changed over its full dynamics from pulse to pulse (within one period of a laser repetition rate), i.e. every single pulse may be generated with particular pulse width.

Figure 6:
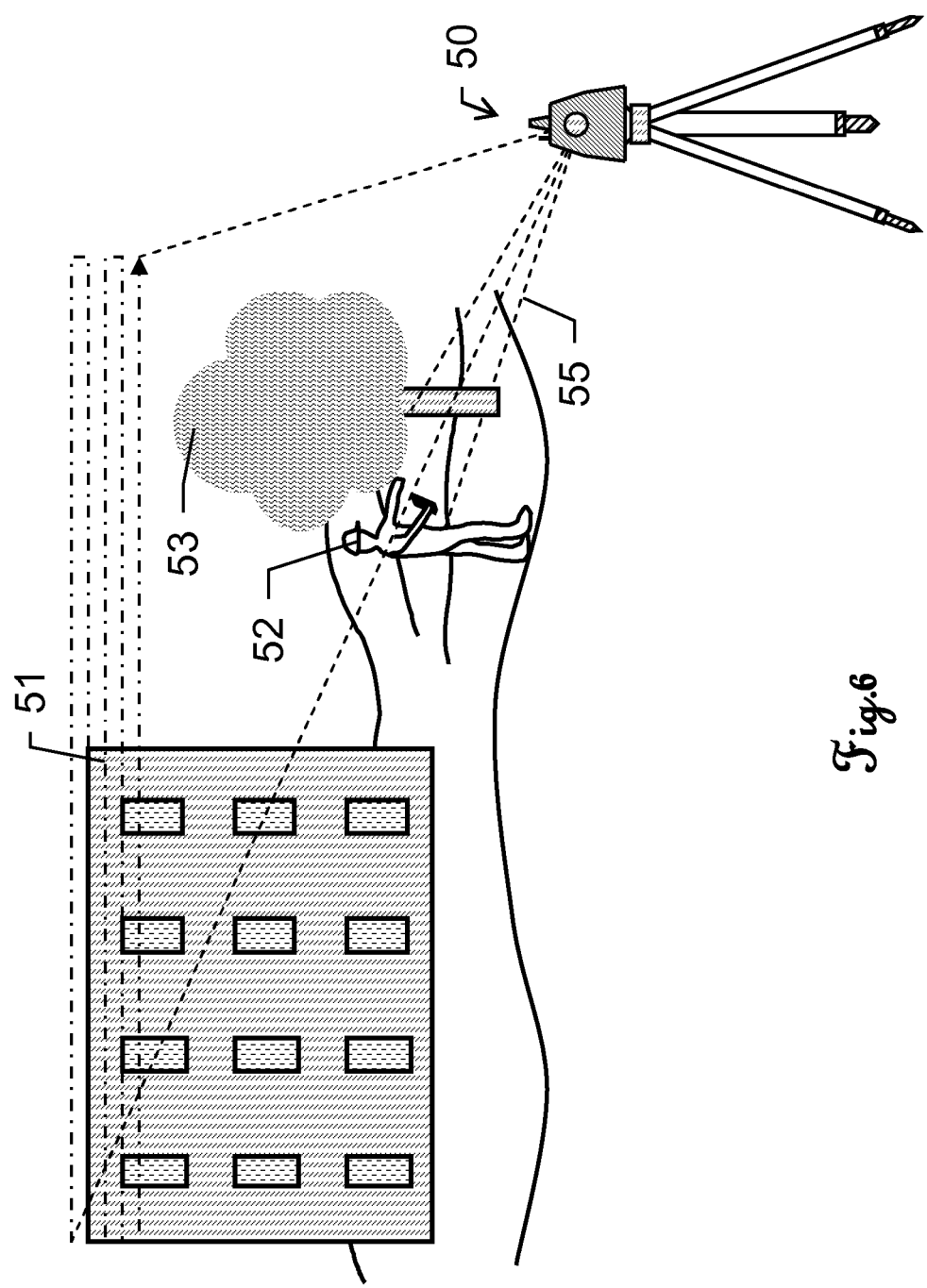
FIG. 6 shows a first embodiment of a laser scanner comprising the adaptation functionality according to the invention.

FIG. 6 shows a first embodiment of an inventive laser scanner 50 comprising the adaptation functionality according to the invention.

The laser scanner 50 provides a scanning functionality for scanning objects 51,52,53 within a scanning field. Distances and angles to points on the objects 51,52,53 in the field are determinable in dependency of a given point-to-point resolution. For this reason, a pulsed laser beam 55 with defined pulse width is emitted from the scanner 50 and guided within the scanning field e.g. by rotation of the scanning station 50 or rotation of a mirror provided with the station 50. The pulse rate and wavelength of the laser light are given and hold fixed during the scanning procedure.

According to the different distances between the scanner 50 and the objects 51,52,53 in the scanning area pulse width of the laser is continuously adapted while scanning. As for the measurement points a distance is determined, the measurement pulse width region, which defines a maximum laser emission level, could be defined for pulses to be emitted in dependency on the respective determined distance and, thus, laser eye-safety could be guaranteed. For measuring the building 51 a higher pulse width leading to higher pulse energy is used (because of higher distance) than for a measurement to the tree 53 or human 52. For preventing eye damage of the human 52 the impinging laser energy on the human 52 has to be reduces to a save level. According to the invention, this reduction is performed by adapting the pulse width.

Furthermore, the pulse width could be fine-adjusted within this region maintaining an eye-safe level so that the performance of a distance measurement is optimised. In particular, such fine-adjustment could be performed considering the signal-to-noise ratio caused by photon noise on side of the laser source and/or caused by the receiver noise generated by the receiver or detector, respectively.

FIG. 7 shows a first embodiment of an inventive total station 60 comprising the adaptation functionality according to the invention. The total station 60 enables to measure precise distances and angles and, thus, to determine exact position of objects 62. Moreover, the total station 60 may provide scanning functionality which is executed slower than scanning with a scanner 50 according to FIG. 6, as for directing the measuring laser 65 a structural aiming unit of the TPS 60 has to be moved instead of moving a mirror only.

The laser 65 emitted from the total station 60 impinges on a target 62 (here: reflecting target, e.g. retro-reflecting prism) with defined laser power (defined amplitude, pulse width and pulse frequency), wherein the target is guided by an operator 61 of the total station 60. According to the present invention, the pulse width of the laser 65 is adapted on basis of a measured distance to the target 62,62a, of a detected measurement performance defined basically by the overall signal-to-noise ratio (photon noise and/or additive noise, e.g. receiver noise), of a selected measurement mode or of a target type. As the distance in a first position of the target 62 is greater than the distance on a second position 62a the pulse width is adapted when the operator moves from his first position 61 to the position 61a with smaller distance to the total station 60. With such a reduction of distance to the target the pulse width of the emitted laser pulses is reduced, too, in order to reduce the total amount of emitted laser light within a defined time interval and to prevent eye damage causable by the laser beam.

What is claimed is:

1. A method for measuring a distance to an object, the method comprising:
   emitting pulsed laser light with defined measurement pulse width, wherein the pulse width of the laser light is adjustable;
   receiving at least a part of the pulsed laser light with defined measurement pulse width reflected from the object; and
   precisely determining the distance (d) to the object by means of the received laser light;
   wherein the defined measurement pulse width of the emitted laser light is provided by pre-adjusting an actual pulse width of the emitted laser light in an automated and continuous manner by:

performing a test measurement by:
  emitting an amount of adjusting laser light with the actual pulse width,
  receiving at least a part of the adjusting laser light reflected from the object, and
  determining a test distance to the object by means of the received adjusting laser light;
defining a measurement pulse width region (R1-Rj) on basis of a defined distance criterion (MPEF), wherein the distance criterion (MPEF) provides at least a maximum laser emission level in dependency of the test distance; and
pre-adjusting the actual laser pulse width so that the pre-adjusted pulse width lies within limits of the measurement pulse width region (R1-Rj) and provides the measurement pulse width.

2. The method according to claim 1, wherein the pre-adjusted pulse width being automatically and continuously fine-adjusted within the measurement pulse width region (R1-Rj) in dependency of a determined measurement performance parameter so that the fine adjusted pulse width provides the measurement pulse width.

3. The method according to claim 2, wherein the measurement performance parameter representing an overall signal-to-noise ratio is defined by a photon noise generated by a stochastic distribution of emitted photons within one single laser pulse.

4. The method according to claim 3, wherein the stochastic distribution of emitted photons comprises a stochastic distribution of photon energy.

5. The method according to claim 3, wherein the overall signal-to-noise ratio is adapted to:
  reduce the measurement pulse width in case of the photon noise being dominant compared to the receiver noise with respect to the overall signal-to-noise ratio, or
  increase the measurement pulse width in case of the receiver noise being dominant compared to the photon noise with respect to the overall signal-to-noise ratio;
  wherein the measurement pulse width is reduced or increased within the measurement pulse width region (R1-Rj), wherein the overall signal-to-noise ratio is reduced.

6. The method according to claim 2, wherein the measurement performance parameter representing an overall signal-to-noise ratio is defined by a receiver noise generated by receiver electronics and/or by signal processing on side of a detector receiving the laser light reflected from the object, wherein the detector is built as a photosensitive detector.

7. The method according to claim 6, wherein the overall signal-to-noise ratio is adapted to:
  reduce the measurement pulse width in case of the photon noise being dominant compared to the receiver noise with respect to the overall signal-to-noise ratio, or
  increase the measurement pulse width in case of the receiver noise being dominant compared to the photon noise with respect to the overall signal-to-noise ratio;
  wherein the measurement pulse width is reduced or increased within the measurement pulse width region (R1-Rj), wherein the overall signal-to-noise ratio is reduced.

8. The method according to claim 2, wherein the measurement performance parameter representing a signal level range for a detector and the preadjusted pulse width is fine-adjusted so that the received laser light matches the signal level range.

9. The method according to claim 1, wherein the distance criterion (MPEF) is given by an algorithm for defining the measurement pulse width region (R1-Rj) by calculating the maximum laser emission level in dependency on the measured test distance.

10. The method according to claim 1, wherein the distance criterion (MPEF) is given by a look-up table for defining the measurement pulse width region (R1-Rj) by comparing the measured test distance with distances which are allocated to particular pulse width regions by the look-up table.

11. The method according to claim 1, wherein determining a direction of emission of the pulsed laser light and deriving a position of the object from the determined direction of the laser light and the precisely measured distance.

12. The method according to claim 1, wherein the maximum laser emission level is defined for each distance (d) by a laser safety regulation.

13. One or more non-transitory computer-readable media storing one or more programs that are configured, when executed, to cause one or more processors to execute the method according to claim 1.

14. The method according to claim 1, further comprising:
  providing an electronic distance meter; and
  performing the method with the electronic distance meter.

15. An electronic distance meter for measurement of a distance (d) to an object, the electronic distance meter comprising:
  a beam source for emission of pulsed laser light with defined measurement pulse width, wherein the beam source is designed such that the laser pulse width is adjustable;
  receiving means for receiving at least a part of the pulsed laser light reflected from the object;
  distance measurement means for precise measurement of the distance (d) to the object by means of the pulsed laser light received by the receiving means; and
  a controlling and processing unit,
  wherein:
    the electronic distance meter comprising a preadjusting functionality, wherein on execution of the pre-adjusting functionality the defined measurement pulse width of the emitted pulsed laser light is provided by pre-adjusting an actual laser pulse width in an automated and continuous manner controlled by the controlling and processing unit by
    performing a test measurement by
      emitting an amount of adjusting laser light with the actual pulse width,
      receiving at least a part of the adjusting laser light reflected from the object and
      determining a test distance to the object by means of received adjusting laser light,
    defining a measurement pulse width region (R1-R5) on basis of a defined distance criterion (MPEF), wherein the distance criterion (MPEF) provides at least a maximum laser emission level in dependency of the test distance, and
    pre-adjusting the actual laser pulse width so that the pre-adjusted pulse width lies within limits of the measurement pulse width region (R1-R5) and provides the measurement pulse width.

16. A laser scanner comprising an electronic distance meter according to claim 15, wherein the laser scanner further comprises:
  a base defining a vertical axis,
  a support member rotateable around the vertical axis relative to the base and defining a horizontal axis, a beam guiding unit rotatable around the vertical and the horizontal axis relative to the base and first angle measurement means for determination of a direction of a beam of pulsed laser light emitted from the beam source and guided with the guiding unit.

17. The laser scanner comprising according to claim 16, wherein the beam guiding unit comprises a mirror.

18. A geodetic measurement device for determination of a position of an object comprising the electronic distance meter according to claim 15, wherein the geodetic measurement device comprises:

a base defining a vertical axis, a support member rotatable around the vertical axis relative to the base and defining a horizontal axis, an aiming unit rotatable around the vertical and the horizontal axis relative to the base for directing the pulsed laser light towards the object comprising:

the beam source and a telescope and second angle measurement means for determination of an orientation of the aiming unit relative to the base and the support member.

19. A total station for determination of a position of an object comprising the electronic distance meter according to claim 15, wherein the geodetic measurement device comprises:

a base defining a vertical axis, a support member rotatable around the vertical axis relative to the base and defining a horizontal axis, an aiming unit rotatable around the vertical and the horizontal axis relative to the base for directing the pulsed laser light towards the object comprising:

the beam source and a telescope and second angle measurement means for determination of an orientation of the aiming unit relative to the base and the support member.

* * * * *